United States Patent
Probst (10) Patent No.: US 11,947,595 B2
(45) Date of Patent: *Apr. 2, 2024

(54) STORING SEMI-STRUCTURED DATA

(71) Applicant: Google LLC, Mountain View, CA (US)

(72) Inventor: Martin Probst, Munich (DE)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/930,318

(22) Filed: Sep. 7, 2022

(65) Prior Publication Data

US 2023/0004598 A1 Jan. 5, 2023

Related U.S. Application Data

(63) Continuation of application No. 17/039,880, filed on Sep. 30, 2020, now Pat. No. 11,461,394, which is a continuation of application No. 15/669,603, filed on Aug. 4, 2017, now Pat. No. 10,817,487, which is a continuation of application No. 14/507,690, filed on Oct. 6, 2014, now Pat. No. 9,754,048.

(51) Int. Cl.
*G06F 16/835* (2019.01)
*G06F 16/21* (2019.01)
*G06F 16/33* (2019.01)
*G06F 16/83* (2019.01)
*G06F 16/84* (2019.01)

(52) U.S. Cl.
CPC ............ *G06F 16/86* (2019.01); *G06F 16/213* (2019.01); *G06F 16/83* (2019.01); *G06F 16/835* (2019.01); *G06F 16/33* (2019.01)

(58) Field of Classification Search
CPC .. G06F 16/2477; G06F 16/211; G06F 16/213; G06F 16/23; G06F 16/2423; G06F 16/33; G06F 16/81; G06F 16/283
USPC ..... 707/999.1, 803, 756, 790, 792, 807, 605
See application file for complete search history.

(56) References Cited

U.S. PATENT DOCUMENTS

| | | |
|---|---|---|
| 6,282,537 B1 | 8/2001 | Madnick et al. |
| 6,581,062 B1 | 6/2003 | Draper et al. |
| 6,604,099 B1 | 8/2003 | Chung et al. |
| 7,519,948 B1 | 4/2009 | Cornish |
| 8,352,510 B2 | 1/2013 | Bornhoevd et al. |
| 2002/0107840 A1 | 8/2002 | Rishe |
| 2003/0140308 A1 | 7/2003 | Murthy et al. |
| 2003/0177341 A1 | 9/2003 | Devillers |

(Continued)

*Primary Examiner* — Robert W Beausoliel, Jr.
*Assistant Examiner* — Pedro J Santos
(74) *Attorney, Agent, or Firm* — Honigman LLP; Brett A. Krueger (57) ABSTRACT

Methods, systems, and apparatus, including computer programs encoded on computer storage media, for storing semi-structured data. One of the methods includes maintaining a plurality of schemas; receiving a first semi-structured data item; determining that the first semi-structured data item does not match any of the schemas in the plurality of schemas; and in response to determining that the first semi-structured data item does not match any of the schemas in the plurality of schemas: generating a new schema, encoding the first semi-structured data item in the first data format to generate the first new encoded data item in accordance with the new schema, storing the first new encoded data item in the data item repository, and associating the first new encoded data item with the new schema.

16 Claims, 5 Drawing Sheets

(56) References Cited

U.S. PATENT DOCUMENTS

| | | |
|---|---|---|
| 2003/0217069 A1 | 11/2003 | Fagin et al. |
| 2005/0262129 A1* | 11/2005 | Hacigumus ............ G06F 16/86 |
| | | 707/999.102 |
| 2006/0053127 A1 | 3/2006 | Wen et al. |
| 2007/0143235 A1 | 6/2007 | Kummamuru et al. |
| 2007/0203922 A1 | 8/2007 | Thomas |
| 2007/0203923 A1 | 8/2007 | Thomas |
| 2008/0301162 A1 | 12/2008 | Wall et al. |
| 2011/0066626 A1 | 3/2011 | Dharmalingam |
| 2012/0047186 A1* | 2/2012 | Shadmon ............ G06F 16/835 |
| | | 707/E17.127 |
| 2013/0166568 A1 | 6/2013 | Binkert et al. |
| 2014/0279828 A1 | 9/2014 | Choudhary et al. |
| 2016/0063078 A1 | 3/2016 | Wang et al. |

\* cited by examiner

FIG. 1

"Example JSON Data Item":
{
    "author": "Ernest Hemingway",
    "title": "The Old Man and The Sea",
    "year published":"1952"
}

{Ernest Hemingway, Old Man and the Sea, 1952}

STORING SEMI-STRUCTURED DATA

CROSS-REFERENCE TO RELATED APPLICATIONS

This U.S. patent application is a continuation of, and claims priority under 35 U.S.C. § 120 from, U.S. patent application Ser. No. 17/039,880, filed on Sep. 30, 2020, which is a continuation of U.S. patent application Ser. No. 15/669,603, filed on Aug. 4, 2017, which is a continuation of U.S. patent application Ser. No. 14/507,690, filed on Oct. 6, 2014. The disclosures of these prior applications are considered part of the disclosure of this application and are hereby incorporated by reference in their entireties.

BACKGROUND

This specification relates to storing semi-structured data.

Semi-structured data is self-describing data that does not conform to a static, predefined format. For example, one semi-structured data format is JavaScript Object Notation (JSON). A JSON data item generally includes one or more JSON objects, i.e., one or more unordered sets of key/value pairs. Another example semi-structured data format is Extensible Markup Language (XML). An XML data item generally includes one or more XML elements that define values for one or more keys.

SUMMARY

In general, this specification describes techniques for extracting facts from collections of documents.

In general, one innovative aspect of the subject matter described in this specification can be embodied in methods that include the actions of maintaining a plurality of schemas, wherein each schema is associated with one or more encoded data items stored in a first data format in a data item repository, wherein each encoded data item stores a respective value at each of one or more locations in the encoded data item, and wherein each schema maps each of the locations in the data items associated with the schema to a respective key to which the value stored at the location in the data items associated with the schema corresponds; receiving a first semi-structured data item, wherein the first semi-structured data item is in a semi-structured data format, and wherein the first semi-structured data item includes one or more first key/value pairs; determining that the first semi-structured data item does not match any of the schemas in the plurality of schemas; and in response to determining that the first semi-structured data item does not match any of the schemas in the plurality of schemas: generating a new schema, wherein the new schema maps each of the locations in a first new encoded data item to a respective key to which the value that is stored at the location in the first new encoded data item corresponds, encoding the first semi-structured data item in the first data format to generate the first new encoded data item by storing values corresponding to values from the first key/value pairs at respective locations in the first new encoded data item in accordance with the new schema, storing the first new encoded data item in the data item repository, and associating the first new encoded data item with the new schema.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

These and other aspects can optionally include one or more of the following features. Determining that the first semi-structured data item does not match any of the schemas in the plurality of schemas includes determining that the keys from the first key/value pairs do not match the keys mapped to by any of the plurality of schemas. The first schema of the plurality of schemas maps each of the keys from the first key/value pairs to locations and identifies requirements for values of one or more of the keys from the first key/value pairs, and determining that the first semi-structured data item does not match any of the schemas in the plurality of schemas includes determining that the values from the first key/value pairs do not satisfy the requirements identified in the first schema.

The aspect further includes the actions of receiving a second semi-structured data item, wherein the second semi-structured data item includes one or more second key/value pairs; determining that the second semi-structured data item matches a second schema from the plurality of schemas; and in response to determining that the second semi-structured data item matches the second schema: encoding the second semi-structured data item in the first data format to generate a second new encoded data item by storing values corresponding to the values from the second key/value pairs at respective locations in the second new encoded data item in accordance with the second schema, storing the second new encoded data item in the data item repository, and associating the second new encoded data item with the second schema. Determining that the second semi-structured data item matches the second schema from the plurality of schemas includes determining that the keys mapped to locations by the second schema match the keys from the second key/value pairs. The second schema identifies requirements for values of one or more of the keys mapped to locations by the second schema. Determining that the second semi-structured data item matches the second schema from the plurality of schemas includes determining that the values from the second key/value pairs satisfy the requirements identified in the second schema.

The aspect further includes receiving a query for semi-structured data items, wherein the query specifies requirements for values for one or more keys; identifying schemas from the plurality of schemas that identify locations for values corresponding to each of the one or more keys; for each identified schema, searching the encoded data items associated with the schema to identify encoded data items that satisfy the query; and providing data identifying values from the encoded data items that satisfy the query in response to the query. Searching the encoded data items associated with the schema includes: searching, for each encoded data item associated with the schema, the locations in the encoded data item identified by the schema as storing values for the specified keys to identify whether the encoded data item stores values for the specified keys that satisfy the requirements specified in the query.

Particular embodiments of the subject matter described in this specification can be implemented so as to realize one or more of the following advantages. By dynamically generating schemas for received semi-structured data items, semi-structured data can be stored in an efficient data format without requiring a schema for the semi-structured data to be specified in advance. Queries for data items stored in the efficient data format can be processed efficiently. Using the dynamically generated schemas, users can easily and effectively analyze the semi-structured data that has been stored by an application in a data item repository. For example, users can easily identify potential data quality issues, e.g., by querying for data items that don't follow an expected schema or schemas that match very few data items. As another example, users can easily identify data items that share common properties or particularly popular schemas, i.e., schemas that are associated with large numbers of data items. As another example, because the schemas are generated when encoded data items are converted, users can precisely determine which schemas are being maintained by a semi-structured data storage system at any given point in time. As another example, application developers developing applications that interact with a semi-structured data storage system can more easily develop applications by being provided an understanding of the schemas being maintained by the semi-structured data storage system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
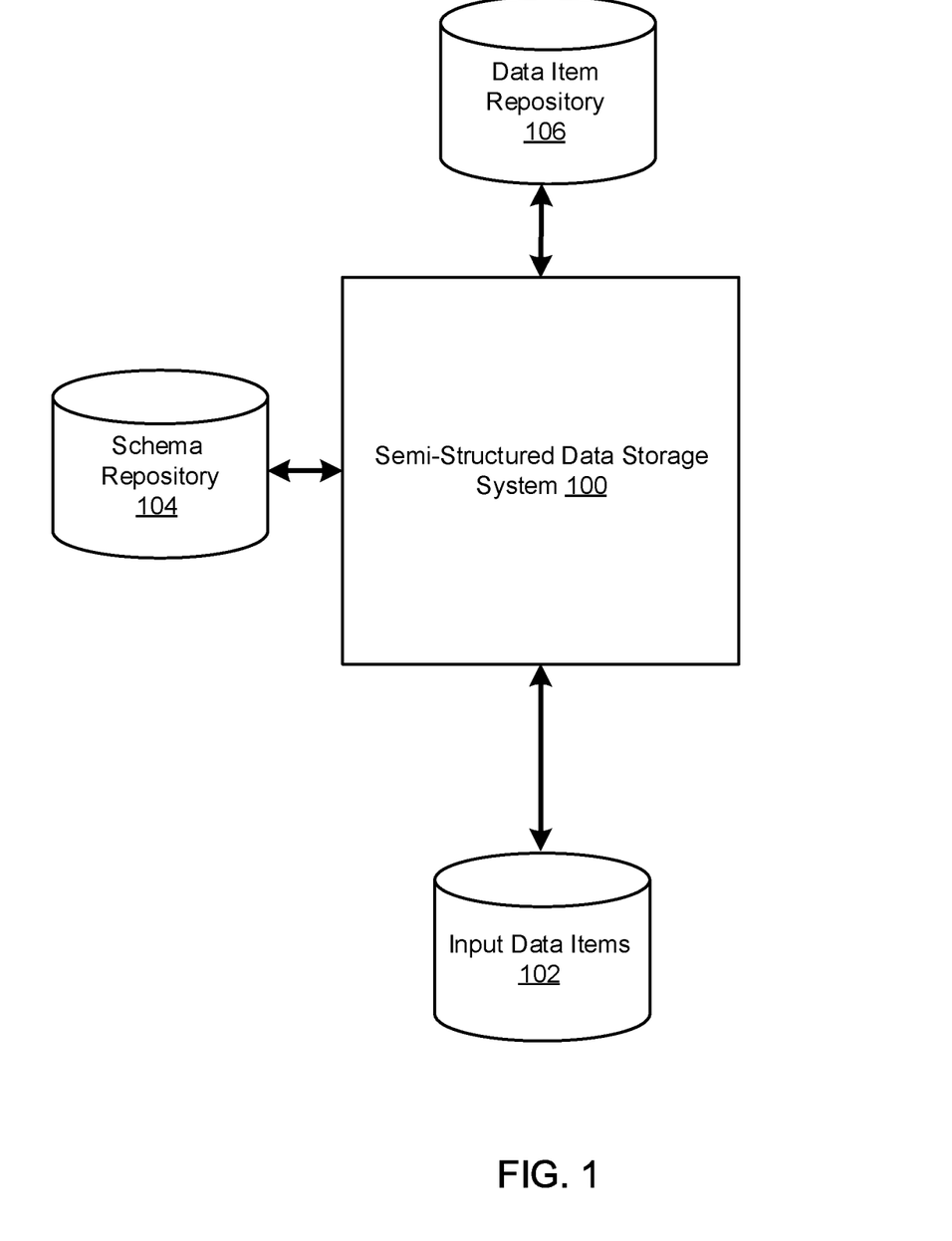
FIG. 1 shows an example semi-structured data storage system.

FIG. 1 shows an example semi-structured data storage system 100. The semi-structured data storage system 100 is an example of a system implemented as computer programs on one or more computers in one or more locations, in which the systems, components, and techniques described below can be implemented.

The semi-structured data storage system 100 receives input data items 102 to be stored in a data item repository 106. In particular, the input data items 102 are instances of semi-structured data that each include one or more key/value pairs. Generally, semi-structured data is self-describing data that does not conform to a static, predefined format. For example, the input data items can be JavaScript Object Notation (JSON) data items that include one or more JSON objects, i.e., one or more unordered sets of key/value pairs. In a JSON object, the key/value pairs are expressed as: {key1: value1, key2: value2, . . . }, where key1/value1 and key2/value2 are each key/value pairs. As another example, the input data items can be Extensible Markup Language (XML) data items that include one or more XML elements that define values for one or more keys. The key/value pairs in a received data item may be unordered, i.e., so that two received data items having the same key/value pairs in a different order are logically equivalent, or ordered, i.e., so that two received data items having the same key/value pairs in a different order are not logically equivalent. The values from the key/value pairs can be any of many different kinds of values, e.g., explicit values or nested key/value pairs.

The semi-structured data storage system 100 encodes each received input data item in a data storage format and stores the encoded data item in the data item repository 106. Generally, the data storage format is an efficient data storage format, i.e., a data format that is defined such that encoding a received data item in the efficient data storage format and storing the encoded data item in the data item repository 106 requires less storage space than storing the received data item directly in the semi-structured data format in which the data item was received. This improves the technological field of data storage and management by utilizing storage resources more efficiently.

In particular, the efficient data storage format is a format that stores values corresponding to the values from each key/value pair, e.g., the value itself or a compressed representation of the value, in a received semi-structured data item without storing the corresponding keys from the key/value pairs. For example, the efficient data storage format can specify that the values be stored as a sequence of bytes or as a sequence of elements, e.g., as an ordered list of values, without storing the corresponding keys from the key/value pairs. However, other efficient data storage formats are possible.

Once the semi-structured data storage system 100 has stored an encoded data item in the data item repository 106, the semi-structured data storage system 100 associates the encoded data item with a schema stored in a schema repository 104. In particular, the semi-structured data storage system 100 generates a given encoded data item by encoding a received semi-structured data item into the efficient data format in accordance with a schema from the schema and then associates the encoded data item with the schema. Each schema in the schema repository 104 contains sufficient information to decode the encoded data items associated with the schema. In particular, each schema in the schema repository 104 maps each location in an encoded data item associated with the schema to a respective key to which the value stored at that location corresponds, i.e., the key from the same key/value pair as the value that corresponds to the value that is stored at that location.

Optionally, each of the schemas can also specify requirements for the values of one or more of the keys mapped to by the schema. For example, in some implementations, the schema specifies a required data type for some or all of the values, e.g., number, string, Boolean, and so on. As another example, in some implementations, the schema specifies size limits for some or all of the values, e.g., that a certain value is a string that does not exceed one hundred bytes. Example schemas are described in more detail below with reference to FIG. 2.

In order to associate data items with schemas, when the semi-structured data storage system 100 receives an input data item 102 to be stored in the data item repository 106, the semi-structured data storage system 100 determines whether any of the schemas in the schema repository 104 match the input data item and, if so, the semi-structured data storage system 100 associates the matching schema with the encoded data item generated from the received input data item. If none of the schemas in the schema repository 104 match the input data item, the semi-structured data storage system 100 generates a new schema for the received input data item, stores the new schema in the schema repository 104, and associates the new schema with the encoded data item generated from the received input data item. This enables the emergence of new schemas without requiring a predefined set of rules or other data storage requirements. The dynamic emergence of new schemas also improves the technological field of data storage and management, as the semi-structured data storage system 100 can handle any type of semi-structured data and is thus very robust and less prone to experiencing processing errors than storage systems that require data that conform to a static, pre-defined format. Additionally, the semi-structured data storage system 100 is easier to use for developers and more extensible than other storage systems. Processing received data items and identifying matching schemas is described in more detail below with reference to FIGS. 3 and 4.

Additionally, the semi-structured data storage system 100 may receive queries for data items that satisfy requirements specified in the query. For example, the semi-structured data storage system 100 may receive queries that specify one or more keys and, for each of the one or more keys, requirements for values for the key. The semi-structured data storage system 100 can identify encoded data items in the data item repository 106 that satisfy the requirements in the query using the schemas in the schema repository 104. Processing a received query to identify encoded data items that satisfy the query is described in more detail below with reference to FIG. 5.

Figure 2:
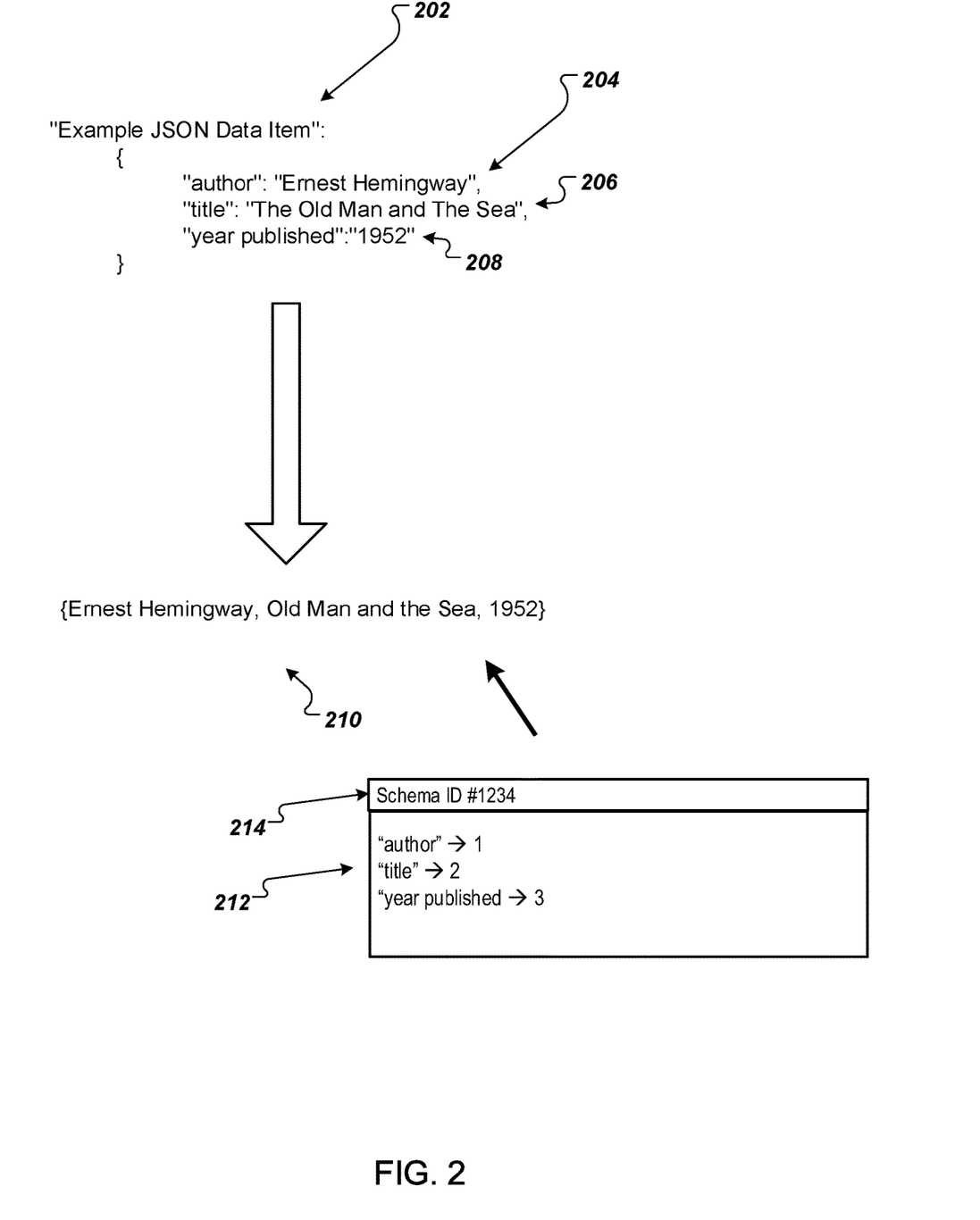
FIG. 2 shows an example semi-structured data item, an example encoded data item generated from the example semi-structured data item, and an example schema associated with the encoded data item.

FIG. 2 shows an example semi-structured data item 202, an example encoded data item 210 generated from the example semi-structured data item 202, and an example schema 212 associated with the encoded data item 210.

The example semi-structured data item 202 is an example JSON object named "Example JSON Data Item." The JSON object includes three key/value pairs 204, 206, and 208. In particular, the key/value pair 204 indicates that the value of an "author" key is "Ernest Hemingway," the key/value pair 206 indicates that the value of a "title" key is "The Old Man and the Sea," and the key/value pair 208 indicates that the value of a "year published" key is "1952."

The encoded data item 210 is generated by encoding the semi-structured data item 202 into an efficient data format. In the example of FIG. 2, the efficient data format specifies that a JSON object be encoded into an ordered list of the values from the key/values pairs in the JSON object. Thus, the semi-structured data item 202 has been encoded into the ordered list "Ernest Hemingway, Old Man and the Sea, 1952."

The schema 212 that is associated with the encoded data item 210 has been assigned a unique identifier 214 ("1234"). For example, the encoded data item 210 can be associated with the schema 210 by storing the identifier 214 for the schema in association with the encoded data item 210 in a data item repository, e.g., the data item repository 106 of FIG. 1. The schema 212 maps the locations in the encoded data item 210 to the keys to which the values stored at the locations correspond. That is, the schema 212 identifies the locations in the encoded data item 210 that store the data representing the "author," "title, and "year" keys, respectively. In particular, the schema 212 identifies that the value of the "author" key is stored in element 1 of the encoded data item 210, the value of the "title" key is stored in element 2 of the encoded data item 210, and the value of the "year published" key is stored in element 3. The example schema 212 may optionally include other information about the values for each of the keys. For example, the example schema 212 may identify a required data type for the values of one or more of the keys, e.g., that the value of the "year" key is required to be a number, a maximum length for the values of one or more of the keys, e.g., that the value of the "author" key is required to be less than 100 bytes, or both.

Additionally, depending on the efficient data format that is used, the schema 212 can identify the locations of the values of the keys in the encoded data item in a different manner. For example, if the efficient data format specifies that the values of the keys from the received data item be encoded into a sequence of bytes, i.e., a sequence that does not include separators between the value, the schema 212 can identify the locations in terms of byte offsets, e.g., that the value for the "title" key is stored between a first byte offset value in the sequence and a second byte offset value in the sequence while the value for the "author" key is stored between a third byte offset value in the sequence and a fourth byte offset value in the sequence. Other techniques for identifying locations of values for particular keys in an encoded data item are possible.

Additionally, instead of explicitly identifying the locations of the values in the encoded data item 210, in some implementations, the schema 214 may instead implicitly identify some or all of the locations by including a reference to one or more other schemas in the schema repository. For example, if another schema in the schema repository identified that the value of the "author" key was stored in element 1, and the value of the "title" key was stored in element 2, but did not identify the location of the value for the "year published" key, the schema 214 could identify the "author" and "title" keys and the locations of the corresponding values by including a reference to the other schema, i.e., a unique identifier for the other schema, and then identify the "year published" key and the location of the value of the "year published" key explicitly as described in the example of FIG. 2.

Figure 3:
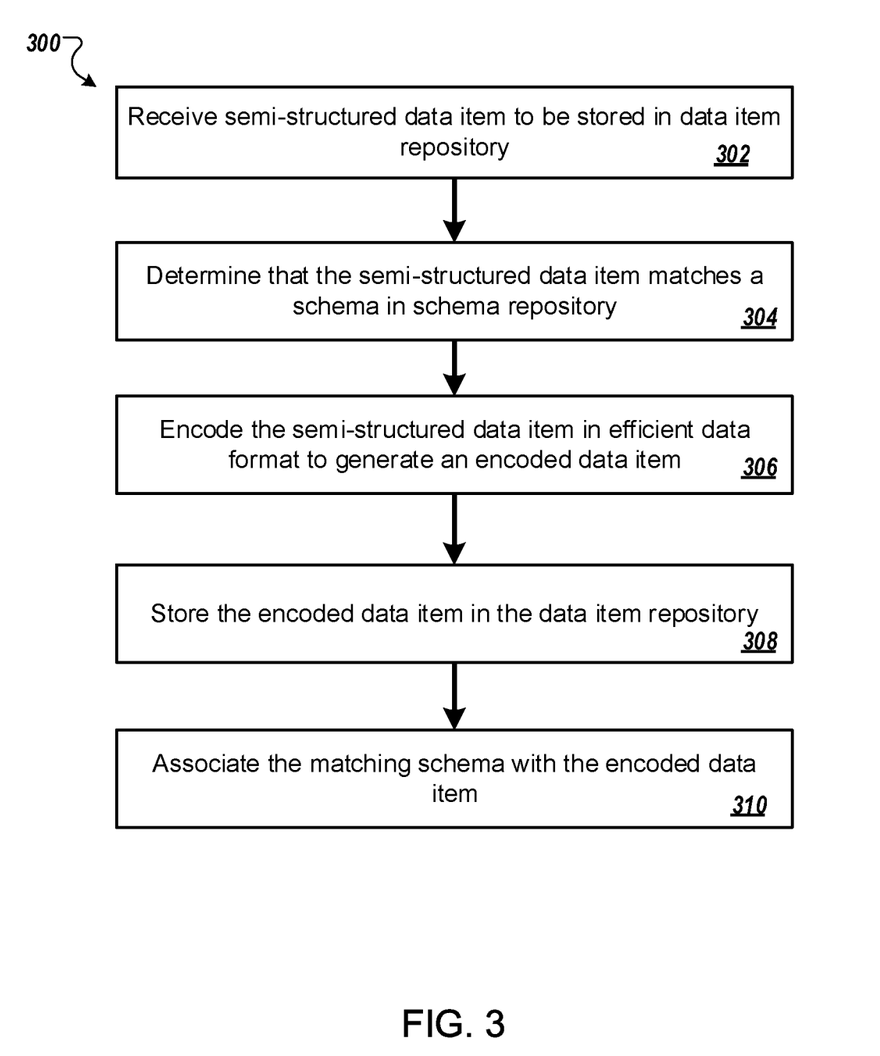
FIG. 3 is a flow diagram of an example process for storing a semi-structured data item in an efficient data format.

FIG. 3 is a flow diagram of an example process 300 for storing a semi-structured data item in an efficient data format. For convenience, the process 300 will be described as being performed by a system of one or more computers located in one or more locations. For example, a semi-structured data storage system, e.g., the semi-structured data storage system 100 of FIG. 1, appropriately programmed in accordance with this specification, can perform the process 300.

The system receives a semi-structured data item that includes one or more key/value pairs to be encoded in an efficient data format and then stored in a data item repository (step 302).

The system determines that the semi-structured data item matches a schema in a schema repository, e.g., the schema repository 104 of FIG. 1 (step 304). As described above, each schema in the schema repository maps locations in encoded data items to keys that correspond to the values stored at the locations.

In order to determine whether the semi-structured data item matches a schema from the schema repository, the system determines whether the keys from the key/value pairs in the semi-structured data item match the keys mapped to by any of the schemas in the schema repository. If the key/value pairs in the semi-structured data item are unordered, the system considers the keys mapped to by a schema to be the same as the keys from the key/value pairs in the semi-structured data item if mapped keys include each of the keys from the key/value pairs in the semi-structured data item and do not include additional keys. If the key/value pairs in the semi-structured data item are ordered, the system also requires that the order of the key/value pairs in the semi-structured data item match the order in which the keys are identified in the mapping. Additionally, if the schemas in the schema repository also identify requirements for values of any of the keys mapped to by the schema, e.g., data type requirements or size requirements, the system also requires that the corresponding values in the semi-structure data item satisfy the requirements identified in the schema.

The system encodes the semi-structured data item into the efficient data format to generate an encoded data item in accordance with the matching schema (step 306). For example, if the efficient data format encodes semi-structured data items as comma-separated ordered lists of the values from the key/value pairs in the semi-structured data items, the system can generate an encoded data item that is a comma-separated list of the values from the key/value pairs in the semi-structured data item, with the order of the values in the list being defined by the locations identified in the matching schema for the corresponding keys. As another example, if the efficient data format encodes semi-structure as a sequence of bytes, the system can generate a sequence of values from the key/value pairs, with the locations of the values in the sequence being defined by the byte offset values identified in the schema for the corresponding keys.

The system stores the encoded data item in the data item repository (step 308) and associates the matching schema with the encoded data item in the repository (step 310). For example, the system can store the encoded data item in the data item repository in association with data identifying the matching schema, e.g., a unique identifier for the schema. As will be described in more detail below with reference to FIG. 5, the system can use the association between the schema and the encoded data item to retrieve key/value data from the encoded data item, e.g., in response to received queries.

Figure 4:
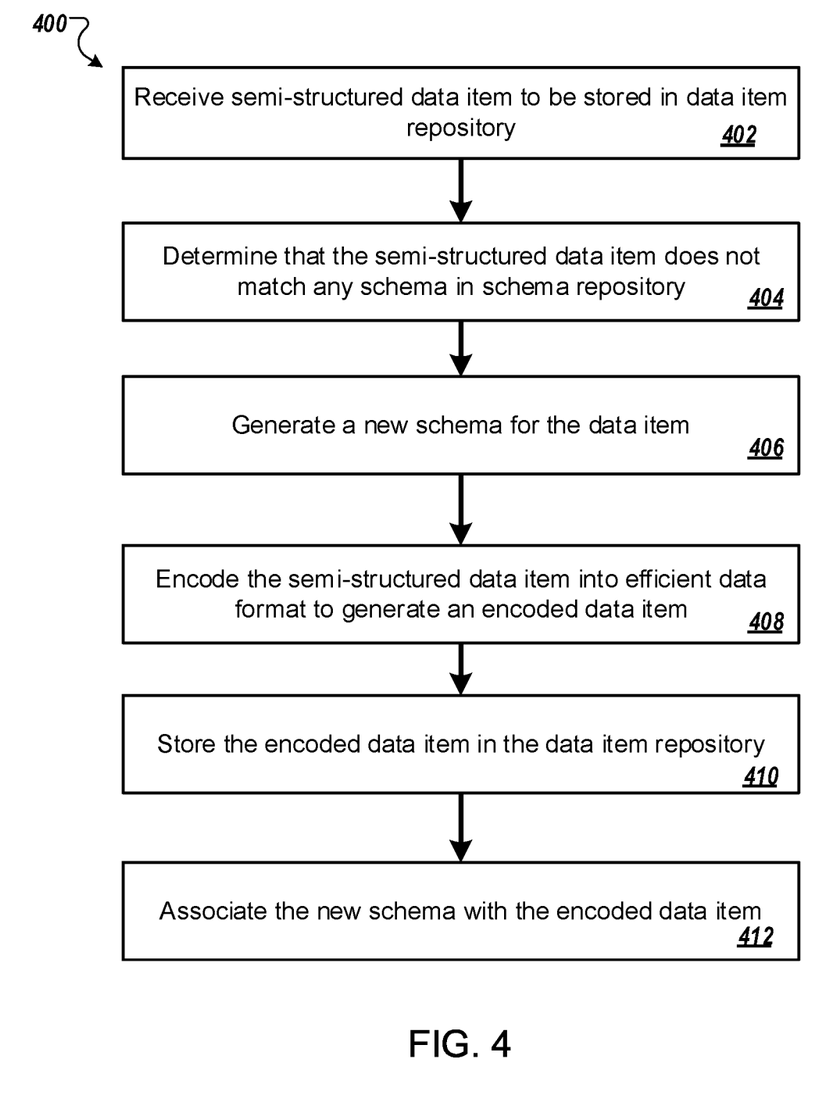
FIG. 4 is a flow diagram of another example process for storing a semi-structured data item in an efficient data format.

FIG. 4 is a flow diagram of another example process 400 for storing a semi-structured data item in an efficient data format. For convenience, the process 400 will be described as being performed by a system of one or more computers located in one or more locations. For example, a semi-structured data storage system, e.g., the semi-structured data storage system 100 of FIG. 1, appropriately programmed in accordance with this specification, can perform the process 400.

The system receives a semi-structured data item to be encoded in an efficient data format and stored in a data item repository (step 402).

The system determines that the semi-structured data item does not match any schema in the schema repository (step 404). That is the system, determines that either the keys from the key/value pairs in the data item are not the same as the keys mapped to by any of the schemas in the schema repository or that one or more of the values from the key/values in the data item do not satisfy the requirements for values of that key in any of the schemas in the schema repository.

The system generates a new schema for the semi-structured data item (step 406). The new schema identifies the key from each of the key/value pairs in the semi-structured data item and, for each of the keys, the location in the encoded data item to be generated from the semi-structured data item that will store the encoded value for the key. The system can use a default technique to determine which location in the encoded data item will store the value for which key, e.g., by encoding the values from the key/value pairs into a sequence of values in a default order or by encoding the values from the key/value pairs into an ordered list in a default order. Optionally, the new schema may also identify, for one or more of the keys, the data type of the value of the key and a maximum length for the values. The maximum length can be assigned to a given value based on a heuristic that is specific to the data type of the value, e.g., that strings can be of maximum 100 characters in length. The heuristic for a given data type can be predetermined or, alternately, can be tuned dynamically by the system. For example, if more than a threshold proportion of received data items have values that exceed the maximum identified by the heuristic, the system can increase the maximum length until less than the threshold proportion are above the maximum.

The system encodes the semi-structured data item into an efficient data format to generate an encoded data item in accordance with the new schema (step 408). The system encodes the semi-structured data item in accordance with the new schema as described above with reference to FIG. 3.

The system stores the encoded data item in the data item repository (step 410).

The system stores the new schema in the schema repository and associates the new schema with the encoded data item (step 412). For example, the system can assign a unique identifier to the new schema and store data associating the unique identifier for the new schema and the encoded data item.

Figure 5:
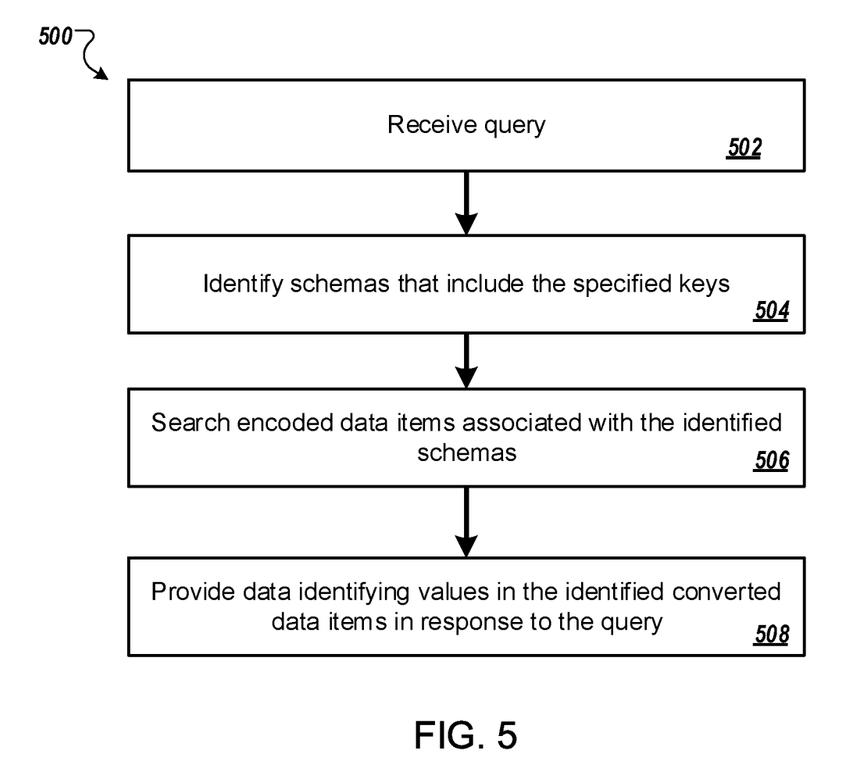
FIG. 5 is a flow diagram of an example process for processing a received query.

FIG. 5 is a flow diagram of an example process 500 for processing a received query. For convenience, the process 500 will be described as being performed by a system of one or more computers located in one or more locations. For example, a semi-structured data storage system, e.g., the semi-structured data storage system 100 of FIG. 1, appropriately programmed in accordance with this specification, can perform the process 300.

The system receives a query (step 502). In particular, the query is a query for semi-structured data items that satisfy specified requirements for values for one or more specified keys. For example, the query may be for semi-structured data items that have a value "Ernest Hemingway" for an "author" key. As another example, the query may be for semi-structured data items that have a value "Ernest Hemingway" for an "author" key and that have values in a range of "1948-1952" for a "year published" key.

The system identifies schemas in the schema repository that include the specified keys (step 504). That is, the system identifies schemas in the schema repository that identify, for each of the specified keys, a location of data representing the value for the key. For example, if the query is for semi-structured data items that have a value "Ernest Hemingway" for an "author" key and that have values in a range of "1948-1952" for a "year published" key, the system can identify each schema that identifies locations of values for both the "author" key and the "year published" key.

For each identified schema, the system searches the encoded data items associated with the schema in the data item repository to identify encoded data items that satisfy the query (step 506). In particular, for each encoded data item associated with a given identified schema, the system searches the locations in the encoded data item identified by the schema as storing values for the specified keys to identify encoded data items that store values for the specified keys that satisfy the requirements specified in the query. For example, if the query is for semi-structured data items that have a value "Ernest Hemingway" for an "author" key and that have values in a range of "1948-1952" for a "year published" key, the system can identify encoded data items that store a value corresponding to "Ernest Hemingway" in the location identified in the schema associated with the encoded data item as storing the value for the "author" key and that store a value in the range from "1948-1952" in the location identified in the schema associated with the encoded data item as storing the value for the "year published" key. Thus, the system can identify encoded data items that satisfy the query efficiently, i.e., without searching encoded data items that do not include values for each key specified in the received query and without searching locations in the encoded data items that are not identified as storing values for the specified keys.

The system provides data identifying the values in the encoded data items that satisfy the query in response to the query (step 508). For example, the system can provide the values stored in the encoded data items in association with their corresponding keys in accordance with a predetermined response format. As another example, for each encoded data item that satisfied the query, the system can reconstruct the semi-structured data item from which the encoded data item was generated based on the schema associated with the encoded data item and provide data identifying the reconstructed semi-structure data item in response to the query. As yet another example, in response to the query, the system may provide the encoded data items that satisfy the query, and, for each encoded data item, data identifying the schema that is associated with the query. Thus, if the system submitting the query has access to the schemas in the schema repository, the submitting system can identify the keys corresponding to the values in a given encoded data item by referring to the schema associated with the key. If the submitting system does not have access to a particular schema, the system can provide the particular schema to the submitting system, e.g., in response to a request or by providing new schemas to the submitting system at regular or irregular intervals.

The system may also receive queries for other types of information. For example, the system may receive a query for schemas that satisfy certain requirements, e.g., schemas that identify a value for a particular key. In response, the system can search the schemas in the schema repository and provide data identifying the schemas that satisfy the requirements as a response to the query.

In some implementations, the system can modify stored schemas in response to user inputs. For example, if a user desires to change the name of a key identified in one or more semi-structured data items, rather than modifying the encoded data items, the user can submit a request to the system to change the name of the key in all or some of the schemas that identify the location of values for the key. In response, the system can modify the keys in the schemas without needing to modify the encoded data items stored in the data repository.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementations or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method when executed by data processing hardware causes the data processing hardware to perform operations comprising:
   maintaining a plurality of schemas, each schema of the plurality of schemas associated with one or more encoded data items stored in a data format in a data item repository, each encoded data item of the one or more encoded data items storing a respective value, wherein each schema maps a location of the respective value in the data item repository to a respective key;
   receiving, from a user, a query for a data item stored in the data item repository, the query specifying a value requirement for a particular key, wherein the value requirement for the particular key comprises a range of values for the particular key;
   identifying two or more schemas of the plurality of schemas that include the particular key;
   for each identified schema of the two or more schemas, identifying data items of the one or more encoded data items satisfying the value requirement specified by the query; and
   providing, to the user, the identified data items that satisfy the value requirement of the query.

2. The method of claim 1, wherein identifying the data items of the one or more encoded data items that satisfy the value requirement specified by the query comprises searching, for each data item associated with a respective identified schema, the location in the data item identified by the respective identified schema as storing values for the particular key to identify whether the data item stores the value for the particular key that satisfy the value requirement of the query.

3. The method of claim 1, wherein providing the identified data items that satisfy the value requirement specified by the query comprises providing the respective value stored in the one or more encoded data items in association with the particular keys.

4. The method of claim 3, wherein providing the identified data items that satisfy the value requirement specified by the query further comprises:
   reconstructing the one or more encoded data items based on a respective identified schema associated with the one or more encoded data items; and
   providing data identifying the one or more reconstructed encoded data items in response to the query.

5. The method of claim 1, wherein each schema of the plurality of schemas identifies requirements for values of the one or more data items.

6. The method of claim 1, wherein each schema of the plurality of schemas identifies a required data type for values of the one or more data items.

7. The method of claim 1, wherein the operations further comprise:
   receiving a modification to a key in the plurality of schemas; and
   modifying the key in the plurality of schemas without modifying the one or more encoded data items stored in the data item repository.

8. The method of claim 1, wherein the plurality of schemas are stored in a schema repository.

9. A system comprising:
   data processing hardware; and
   memory hardware in communication with the data processing hardware, the memory hardware storing instructions that when executed on the data processing hardware cause the data processing hardware to perform operations comprising:
      maintaining a plurality of schemas, each schema of the plurality of schemas associated with one or more encoded data items stored in a data format in a data item repository, each encoded data item of the one or more encoded data items storing a respective value, wherein each schema maps a location of the respective value in the data item repository to a respective key;
      receiving, from a user, a query for a data item stored in the data item repository, the query specifying a value requirement for a particular key, wherein the value requirement for the particular key comprises a range of values for the particular key;
      identifying two or more schemas of the plurality of schemas that include the particular key;
      for each identified schema of the two or more schemas, identifying data items of the one or more encoded data items satisfying the value requirement specified by the query; and
      providing, to the user, the identified data items that satisfy the value requirement specified by the query.

10. The system of claim 9, wherein identifying the data items of the one or more encoded data items that satisfy the value requirement of the query comprises searching, for each data item associated with a respective identified schema, the location in the data item identified by the respective identified schema as storing values for the particular key to identify whether the data item stores the value for the particular key that satisfy the value requirement specified by the query.

11. The system of claim 9, wherein providing the identified data items that satisfy the value requirement specified by the query comprises providing the respective value stored in the one or more encoded data items in association with the particular keys.

12. The system of claim 11, wherein providing the identified data items that satisfy the value requirement specified by the query further comprises:
    reconstructing the one or more encoded data items based on a respective identified schema associated with the one or more encoded data items; and
    providing data identifying the one or more reconstructed encoded data items in response to the query.

13. The system of claim 9, wherein each schema of the plurality of schemas identifies requirements for values of the one or more data items.

14. The system of claim 9, wherein each schema of the plurality of schemas identifies a required data type for values of the one or more data items.

15. The system of claim 9, wherein the operations further comprise:
    receiving a modification to a key in the plurality of schemas; and
    modifying the key in the plurality of schemas without modifying the one or more encoded data items stored in the data item repository.

16. The system of claim 9, wherein the plurality of schemas are stored in a schema repository.

* * * * *